United States Patent [19]
Schur

[11] Patent Number: 4,746,518
[45] Date of Patent: * May 24, 1988

[54] PROCESS FOR THE PREPARATION OF ALCOHOL-FREE DRINKS WITH A YEAST AROMA

[75] Inventor: Fritz Schur, Magden, Switzerland

[73] Assignee: Brauerei Feldschlosschen, Switzerland

[*] Notice: The portion of the term of this patent subsequent to Apr. 28, 2004 has been disclaimed.

[21] Appl. No.: 17,354

[22] Filed: Feb. 24, 1987

Related U.S. Application Data

[63] Continuation of Ser. No. 715,583, Mar. 25, 1985, Pat. No. 4,661,355, which is a continuation of Ser. No. 366,118, Apr. 7, 1982, abandoned.

[30] Foreign Application Priority Data

Jan. 4, 1982 [CH] Switzerland .............................. 11/82

[51] Int. Cl.$^4$ ......................... C12C 11/00; C12G 1/00
[52] U.S. Cl. ........................................ 426/15; 426/16; 426/41; 426/29; 426/592
[58] Field of Search ....................... 426/14, 15, 16, 29, 426/599, 600, 431, 41, 42, 43, 12, 590, 592

[56] References Cited

U.S. PATENT DOCUMENTS 2,077,448  4/1937  Wallerstein ........................... 426/12
3,903,316  9/1975  Hoover ................................. 426/16

FOREIGN PATENT DOCUMENTS 0127861  11/1978  Japan .................................. 426/590

Primary Examiner—Raymond N. Jones
Assistant Examiner—Marianne M. Cintins
Attorney, Agent, or Firm—Ladas & Parry

[57] ABSTRACT

To prepare alcohol-free drinks with a yeast aroma, such as alcohol-free beer, an aqueous starting liquid containing nutrients and/or flavor substances is used. The starting liquid can be prepared by mixing a nutrient and/or flavor substance concentrate with water. A yeast is removed from a fermentation process and is freed from the fermented liquid. The starting liquid and the yeast are brought into contact with one another, and in particular at such low temperatures that virtually no alcoholic fermentation occurs. The starting liquid and the yeast are left in contact with one another until the aroma substances of the yeast have diffused from the cell into the liquid and the yeast has exerted its reducing effect.

1 Claim, No Drawings

PROCESS FOR THE PREPARATION OF ALCOHOL-FREE DRINKS WITH A YEAST AROMA

This is a continuation of co-pending application Ser. No. 715,582 filed on Mar. 25, 1985, now U.S. Pat. No. 4,661,355, which is a file wrapper continuation of Ser. No. 366,118, filed Apr. 7, 1982.

The invention relates to a process for the preparation of alcohol-free drinks with a yeast aroma, such as beer, wine or fruit wine, starting from an aqueous liquid which contains nutrients and/or flavour substances. The liquid can, but does not have to be, fermentable with yeast to give an alcoholic drink. Fermentable liquids, which can be used for this purpose are, for example, finished wort, grape juice and fruit juice. Whey is an example of a suitable non-fermentable liquid. The starting liquids can also be prepared by mixing an appropriate nutrient and/or flavour substance concentrate with water.

Having regard to their health and weight and to the warnings of the consequence of alcohol abuse, especially in traffic, consumers increasingly prefer so-called low-alcohol and alcohol-free drinks, such as alcohol-free beer or alcohol-free wine or fruit wine. The expressions "low-alcohol" and "alcohol-free" have different definitions in different countries, and their use is not permitted in all countries. Arabic countries have recently demanded an alcohol content of 0.0 % by volume, that is to say if there is any alcohol content at all, it may only be in the second place after the decimal point. The process according to the invention thus enables drinks in which an alcohol content can no longer be detected (the detection limit is about 0.05% by weight of alcohol at present) to be prepared. The state of the art is described below, using an example of the preparation of an "alcohol-free" beer.

Processes for the preparation of low-alcohol or alcohol-free beer are based on two principles. In processes of the first type, the formation of alcohol during fermentation is curtailed. However, these processes always give beers with a significant alcohol content, and as a rule with a very sweet, malty, bitter and inharmonious flavour because of the high content of dry substance and the pH value and the content of fermentation by-products. In processes of the second type, the alcohol formed during fermentation is subsequently removed from the beer, but this is in most cases associated with a loss of aroma substances which are desirable from a flavour point of view and in some cases with the formation of aroma substances which are rather disadvantageous. Production of beer with an alcohol content of less than 0.05% by weight was hitherto only possible by separating off the alcohol from normal beer by distillation. However, apart from the considerable expense, especially from the point of view of apparatus and energy, considerable exposure to heat is also always to be reckoned with.

All of the other processes, such as, for example, partial fermentation, the use of yeasts which are not capable of utilising maltose or maltotriose, dialysis or reverse osmosis, it is virtually impossible to prepare an alcohol-free beer with an alcohol content of less than 0.05% by weight.

German Offenlegungsschrift No. 2,832,487 from Nordbräu Ingolstadt GmbH & Co. KG discloses, for example, a process for the preparation of beer with a reduced alcohol content by fermentation of wort prepared from malt mash, in which the non-aerated wort is fermented in a fermentation vessel, which has first been completely freed from oxygen, at a temperature of 4° to 7° C. with a yeast addition of 0.25 to 0.35 liter of thick liquid brewer's yeast per hectoliter of wort under a pure $CO_2$ atmosphere until the desired alcohol content is reached. It is said to be possible to prepare a beer in which the alcohol content can be reduced to about 0.2% by weight but which corresponds to a conventional alcohol-containing beer in respect of aroma, flavour, foaming properties and colour by this process.

Further details relating to the preparation of low-alcohol beer can be found, for example, in H. Kieninger and J. Haimerl, Brauwelt 121, 574–581 (1981); M.W. Brenner, MBAA Technical Quarterly 17, 185–195 (1980); E. Krüger, B. Oliver-Daumen, G. Sommer, M. Metscher and H. Berger, Monatsschrift für Brauerei 33, 422–430 (1980); and P. Jäger and J. Püspok, Mitteilungen der Versuchsstation für das Garungsgewerbe in Wien 32, 36–40 (1978).

The process according to the invention is thus based on the idea of bringing the starting liquids for the preparation of alcohol-free drinks, (which may optionally be prepared from concentrates, such as wort or must concentrate) into contact, at temperatures which are so low that virtually no alcoholic fermentation takes place, with a yeast which has been removed from the fermentation process and has been freed from the fermented liquid.

It was hitherto believed that yeast releases no aroma substances at low temperatures, for example, below 0° C. However, it has been found that the aroma substances still diffuse from the yeast into a liquid even at temperatures below the freezing point of the liquid. The yeast thereby additionally has a reducing effect, by which means, for example, aldehydes, which could impart an undesirable aroma to the drink, can be reduced. The starting liquid and the yeast can be brought into contact with one another at, for example temperatures below 3° C., preferably below 0° C. and in particular as close as possible to the freezing point of the liquid, for example, at −0.4° to −0.5° C.

The starting liquid is preferably brought, by dilution, to a dry substance content such that the flavour of the alcohol-free drink is balanced, (for example in the case of beer is not too malty), that is to say, for example, is not too sweet, too watery or too bitter. A fermentable starting liquid can advantageously be adjusted to a dry substance content such as would be obtained after alcoholic fermentation. However, the dilution can also be effected only after the liquid has been brought into contact with the yeast. The dilution is preferably carried out with oxygen-free and/or sterilised and optionally softened water. The dry substance content of the starting liquid is preferably below 30% by weight.

It is as a rule likewise advantageous to reduce the pH value of the starting liquid, because the flavour of the alcohol-free drink is thereby improved, alcoholic fermentation is additionally suppressed, and the danger of micro-biological contamination is decreased. For this purpose, diluted sulphuric acid or an edible acid, such as malic acid, lactic acid or tartaric acid, can be added to the starting liquid until the pH values reaches, for example, 2 to 6, preferably 3 to 5 and in the case of alcohol-free beer in particular about 4. Micro-biological acidification, for example, with a lactic acid solution from a culture of lactic acid bacteria, is, however equally suitable.

The dry substance content and the pH value are preferably simultaneously adjusted by addition of a water-/acid mixture, but it is equally possible first to adjust the dry substance content by addition of water and then to adjust the pH value by addition of acid. It is possible to use, for example, brewing liquor, which as a rule contains fewer micro-biological germs than drinking water and less bicarbonates, or oxygen-free and/or sterilised and optionally softened water, to which, if appropriate, the abovementioned acids are added in the required amount, which also depends on the eventual presence of buffer salts in the starting liquid.

To protect the yeast aroma substances and the contents and to increase the carbonation or freshness of the starting liquid and/or of the alcohol-free drink, the cooled starting liquid and/or the alcohol-free drink are preferably saturated with carbon dioxide in a manner which is known per se. The carbon dioxide content can be up to 10 g per liter, preferably about 5 g per liter.

Preferably, the yeast is brought into contact with the starting liquid directly after removal from the fermentation process. It is preferably freed completely from the fermented liquid. Examples of suitable yeasts are the following:

Saccharomyces cerevisiae (a top-fermenting brewer's yeast),
Saccharomyces carlsbergensis (a bottom-fermenting brewer's yeast),
Saccharomyces uvarum (a bottom-fermenting brewer's yeast), and
Saccharomyces ellipsoideus (wine yeast)

However, it is also possible to use other yeast or yeast mixtures. As a rule, in the preparation of alcohol-free beer, 0.1 to 4 liters of thick liquid yeast are added per hectoliter of finished wort. This means that about 2,000,000 to 150,000,000 yeast cells per ml are present in the mixture of yeast and finished wort.

The procedure for the preparation of alcohol-free beer can be as follows:

Finished wort is brought to a pH value of 3 to 6, preferably 4, and a dry substance content of 6 to 12% by weight, preferably 6% by weight, and is cooled to a temperature below 3° C., preferably below 0° C. and in particular to −0.4° to −0.5° C. A non-watered yeast which has been freshly removed from the fermentation process and has been freed completely from the fermented beer is now added in an amount of 0.1 to 4 liters, preferably 1 liter, per hectoliter (about 30,000,000 yeast cells per ml) of dilute acidic finished wort. The mixture is mixed intermittently or continuously and is kept at the above temperature. It is preferably percolated and super-saturated with carbon dioxide. After a sufficient contact period, preferably 24 to 48 hours, the yeast is separated off without trace from the alcohol-free beer at the above temperature. The dry substance content, the pH value and the carbon dioxide content can now additionally be adjusted to the desired value.

It is possible to stabilise the alcohol-free beer, for example by filtration over polyvinylpolypyrrolidone, silica gel, a hydrogel or a xerogel, or by degradation of the high-molecular protein substances with enzymes, so that no colloidal precipitates which cause refraction of light or haze form during storage. The alcohol-free beer it then bottled and pasteurised, in order to prevent deterioration of quality as a result of micro-organisms.

The desired aroma substances diffuse to a relatively high degree into the finished wort, and a product of higher quality is obtained if the wort has as comparatively low dry substance content and pH value.

EXAMPLE

Normal, hop finished wort is freed from sediment and cooled to about 0° C.

Fresh yeast which originates from a fermentation vat and has been cooled to about 0° to 5° C. is freed from beer. If necessary, to remove ethanol still present in the yeast suspension, it is pressed or suspended for a short time with micro-biologically clean water and decanted from the supernatant liquor.

The cooled finished wort is adjusted to a pH value of about 4 and a dry substance content of about 6% by weight with diluted sulphuric acid or edible acid or microbiologically prepared lactic acid solution, the acid having been freed from oxygen and super-saturated with carbon dioxide.

Before they are brought together, the yeast and the beer wort are cooled to −0.4° to −0.5° C. About 0.5 liter of thick liquid cooled yeast is added to 1 hectoliter of wort. The mixture is kept at −0.4° to −0.5° C. and is mixed, for example by percolation with carbon dioxide or pumping round and by bubbling in carbon dioxide. After a contact period of about 48 hours, the yeast is separated off without trace from the alcohol-free beer at a temperature below 0° C.

The alcohol-free beer is brought to a dry substance content of 6.0% by weight, a pH value of 4.1 and a carbon dioxide content of 5.2 g per liter, and is stabilised by filtration over polyvinylpolypyrrolidone, filled into bottles or kegs and pasteurised.

The alcohol-free beer thus prepared has an alcohol content below 0.05% by weight. It corresponds to conventional alcohol-containing beer in respect of aroma, flavour, foaming properties, clarity and colour.

If, instead of 0.5 liter, up to 4 liters of thick liquid yeast or the corresponding amount of pressed yeast are added per hectoliter of wort, a similar alcohol-free beer is obtained.

I claim:

1. In a process for preparation of a beverage having a yeast aroma which comprises isolating yeast from a fermentation process and removing fermented liquid of said fermentation process from the yeast, contacting said isolated yeast with an aqueous liquid containing nutrients, flavour substances or a combination thereof suitable for human consumption and removing the yeast totally from said aqueous liquid to provide said beverage, the improvement which comprises carrying out said contacting at a temperature of about −0.4° C. or below for a period of time sufficient to have aroma substances of the yeast diffuse from the cells thereof into said aqueous liquid, to have aroma reactions between the yeast and said aqueous liquid take place, or both, said aqueous liquid having a dry substance content of about 6 to 12% by weight, said isolated yeast being employed at a ratio of 0.1 to 4 liters on a nonwatered, thick liquid basis per hectoliter of said aqueous liquid and wherein substantially no production of alcohol occurs during the process.

* * * * *